United States Patent [19]
Matchett

[11] 3,881,675
[45] May 6, 1975

[54] CAMERA TRIPOD

[76] Inventor: John C. Matchett, 2851 Rolling Hills Dr., Space No. 79, Fullerton, Calif. 92635

[22] Filed: Jan. 4, 1974

[21] Appl. No.: 430,799

[52] U.S. Cl. ................. 248/170; 248/178; 248/187
[51] Int. Cl. ............................................ F16m 11/38
[58] Field of Search .......... 248/411, 412, 431, 170, 248/168, 169, 178, 186, 187

[56] References Cited
UNITED STATES PATENTS

| | | | |
|---|---|---|---|
| 686,872 | 11/1901 | Whetham | 248/169 |
| 840,395 | 1/1907 | Stone | 248/187 |
| 2,166,258 | 7/1939 | Matrat | 248/187 |
| 2,767,989 | 10/1956 | Luebbers | 248/187 |
| 2,919,093 | 12/1959 | Mooney | 248/168 |
| 3,211,405 | 10/1965 | Fey et al. | 248/168 |

*Primary Examiner*—Roy D. Frazier
*Assistant Examiner*—Robert A. Hafer
*Attorney, Agent, or Firm*—Philip H. Hinderstein

[57] ABSTRACT

In a camera tripod of the type including a plurality of elongate legs, an elongate column including a camera-connecting fitting at one end thereof, and a central platform member for receiving and supporting the upper ends of the legs and the elongate column, there is disclosed the improvement wherein the central platform member supports the legs for substantially unlimited freedom of movement and includes unitary locking means for simultaneously, and in one operation, locking all of the legs and the column to the central platform member.

6 Claims, 5 Drawing Figures

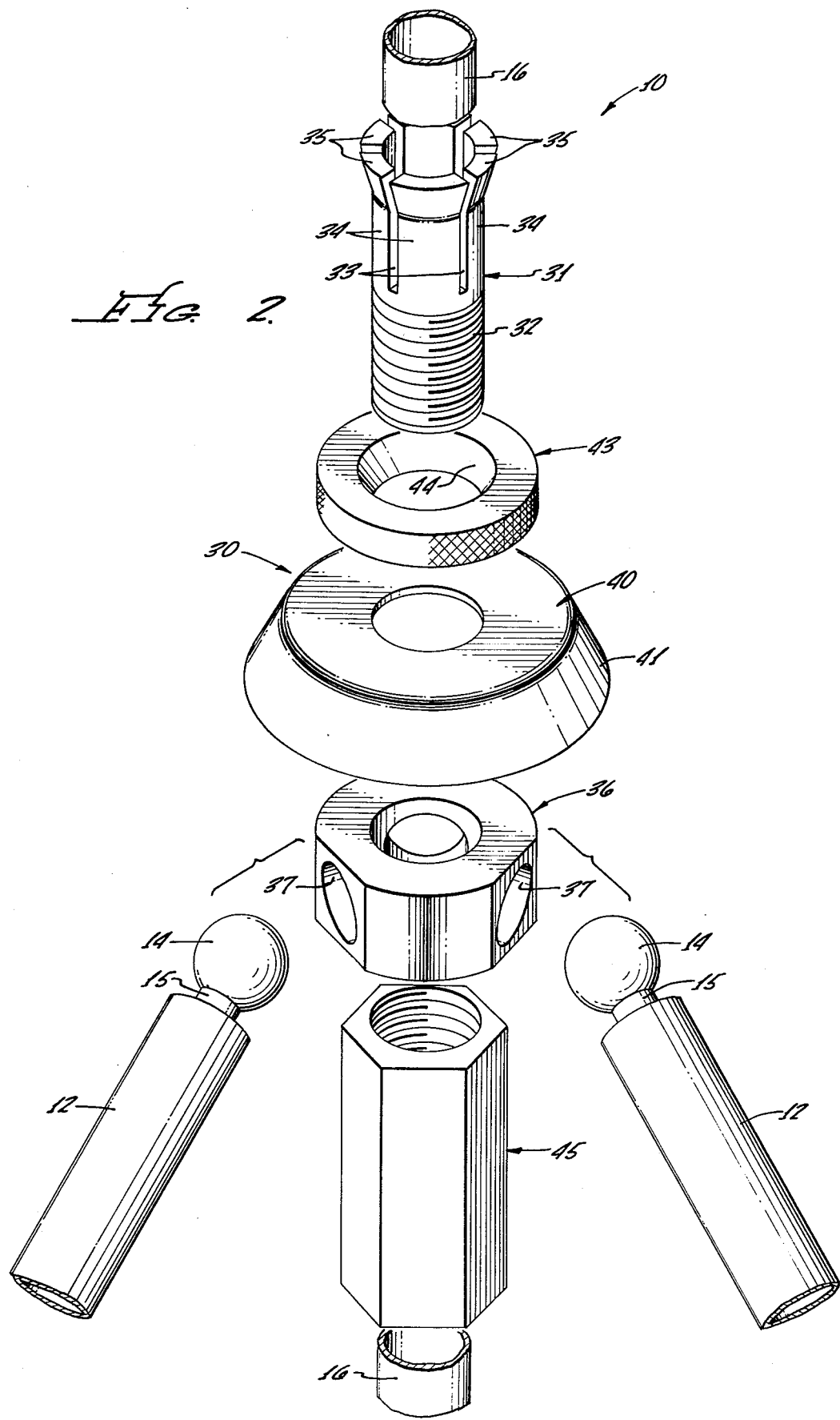

CAMERA TRIPOD

BACKGROUND OF THE INVENTION

1. Field of the Invention

The present invention relates to a camera tripod and, more particularly, to a camera tripod of increased utility and convenience due to the flexibility of movement of the legs thereof and the inclusion of a unitary locking means for simultaneously locking the multiple elements thereof.

2. Description of the Prior Art

It is well known to serious photographers that it is highly desirable to use a tripod to take high quality photographs. The tripod includes a plurality of legs connected to a central platform member which receives the camera and rigidly supports the camera above a firm base, preventing movement of the camera when taking photographs. As a result, there is a large market for tripods and a wide variety of different designs are available.

In spite of the availability of many different types of tripods, all have certain disadvantages associated therewith. In the first instance, the legs of most tripods are connected to the central platform member in such a manner that each leg pivots about a horizontal axis between a position where the legs are parallel and a position where the legs are uniformly spaced around the tripod at 120° intervals. Furthermore, the legs are not firmly locked relative to the central platform member until they reach their outermost positions. These tripods were obviously designed on the assumption that they would always be used on a flat surface where it is acceptable to uniformly space, at a fixed angle, the legs of the tripod. However, this is a faulty assumption since photographers often take their cameras "into the field" where a wide variety of surfaces and terrain contours are encountered. Thus, simply extending each of the tripod legs to its normal position and positioning the tripod on the ground often results in the platform being located in other than a horizontal plane.

In an attempt to solve this problem, it has been proposed to make each leg of the tripod adjustable in length so that the platform may be horizontally leveled. Alternatively, the platform itself supports a second platform which may be adjusted relative to the first platform to a horizontal plane. In both instances, the tripod is complex and expensive and cumbersome to use.

Furthermore, these techniques still do not solve the basic problem, i.e. it may be inconvenient or impossible to pivot each of the legs in the same angular direction, for the same angular amount. Circumstances may dictate that the different legs be positioned in random directions, by variable angles relative to a vertical reference line through the central platform member.

Still another problem which is common to essentially all tripods results from the fact that a number of different adjustments are required in order to bring the camera to the exact position at which a photograph is to be taken. Thus, as discussed previously, the legs must be pivoted outwardly and adjusted in both angle and length. The legs must then be locked to the central platform member to provide a firm support. The tripod typically includes an elongate column including a camera-connecting fitting at one end thereof, which column is axially movable relative to the central platform member in order to adjust the vertical position of the camera. Once such vertical position is located, the column must be locked to the central platform member. Thus, what one typically ends up with is a plurality of adjusting devices as well as a plurality of locking devices and this too adds to the complexity and expense of the tripod, while being cumbersome to use in practice. Furthermore, once all of the movable parts are locked, if a slight adjustment is required, it is necessary to release the locking device, make the adjustment, and then relock the mechanism. This is time consuming and bothersome.

SUMMARY OF THE INVENTION

According to the present invention, there is provided a camera tripod which solves these problems in a manner unknown heretofore. With the present tripod, the legs are connected to the central platform member in such a manner that they are permitted substantially unlimited freedom of movement within a given sector. Thus, the legs can be positioned in any desired direction and at any desired angle relative to a vertical reference line to permit convenient use on any irregular surface. This eliminates the necessity for adjustable legs and second platforms adjustably mounted to the central platform member. Furthermore, after the legs of the present tripod are positioned, if the central platform member is not horizontal, it may be readily moved into a horizontal plane without any readjustment of the positions of the legs.

The present tripod is substantially simpler than existing tripods in that the central platform member includes a unitary locking device for simultaneously, and in one operation, locking to the central platform member, not only all of the legs, but an elongate column which is freely axially movable relative to the central platform member. Furthermore, once such unitary locking means is activated to firmly interconnect the legs, the central platform member, and the column, there is still a sufficient degree of flexibility so that the platform may be rotated about a vertical axis or tilted about any horizontal axis to permit minor adjustments in the position of the camera without the necessity of releasing the locking device.

With the above features, the present tripod results in a considerable simplification and can be manufactured and sold at a price which is substantially less than existing tripods. Furthermore, as a result of the simplification, the present tripod is much more convenient to use and permits use in a wider variety of situations than available heretofore.

Briefly, the present tripod comprises a plurality of elongate legs, each of which terminates in a spherical ball at the upper end thereof, an elongate column including a camera-connecting fitting at one end thereof, and a central platform member for receiving and supporting the upper ends of the legs and receiving and supporting for movement in an axial direction the elongate column. The central platform member includes a collet surrounding the elongate column and having an externally threaded lower end and slotted upper end, the collet further having a tapered, increased-thickness upper end; a generally cylindrical trunnion surrounding a central portion of the collet and having a plurality of recesses in the outer surface thereof for receipt of portions of the spherical balls at the upper ends of the legs; a disc-shaped cap surrounding the collet, above the trunnion, and extending radially outwardly and then angularly downwardly to contact the spherical balls on the sides thereof opposite from the recesses in the trunnion; a cylindrical collar surrounding the collet, between the upper end thereof and the cap, the collar having a tapered inside surface which is identical to and engages the tapered upper end of the collet; and an elongate nut surrounding the collet, below the trunnion, and engaging the external threads thereon whereby tightening of the nut draws the nut towards the upper end of the collet, simultaneously urging the trunnion towards the cap thereby tightening the spherical balls between the trunnion and the cap to lock the legs to the trunnion and forcing the tapered, increased-thickness, upper end of the collet into the collar thereby tightening the slotted upper end of the collet around the column to lock the column to the collet.

OBJECTS

It is therefore an object of the present invention to provide a novel camera tripod.

It is a further object of the present invention to provide a camera tripod of increased utility and convenience due to the flexibility of movement of the legs thereof.

It is a still further object of the present invention to provide a camera tripod of increased utility and convenience due to the inclusion of a unitary locking means for simultaneously locking the multiple elements thereof.

It is another object of the present invention to provide a tripod in which the legs are connected to the central platform member in such a manner that they are permitted substantially unlimited freedom of movement within a given sector.

It is still another object of the present invention to provide a camera tripod having a single adjusting and locking device.

Another object of the present invention is the provision of a camera tripod which permits slight adjustments in the positions of the members thereof after all of the parts are locked.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 2 is an enlarged, exploded, perspective view of the central platform member of the camera tripod of FIG. 1 and portions of the parts connected thereto;

DESCRIPTION OF THE PREFERRED EMBODIMENT

Figure 1:
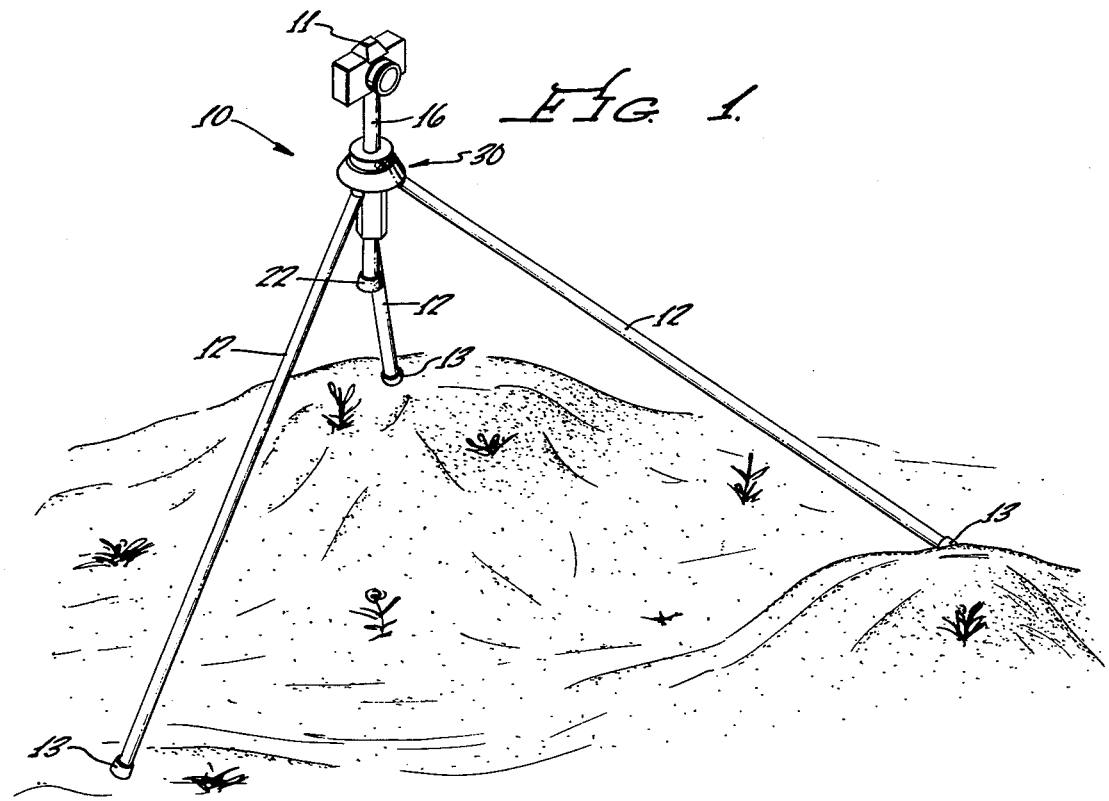
FIG. 1 is a perspective view of a camera tripod constructed in accordance with the teachings of the present invention.

Referring now to the drawings, there is shown a tripod, generally designated 10, for supporting a camera 11 or any other suitable object. Tripod 10 comprises a plurality of identical, elongate, hollow, cylindrical legs 12, each of which may have a rubber tip 13 at the lower end thereof. At the upper ends thereof, each leg 12 terminates in a spherical ball 14 which is connected to leg 12 by means of a post 15.

Tripod 10 further includes an elongate, hollow, cylindrical column 16 having a camera-connecting fitting 17 at one end thereof. Fitting 17 may consist of a bolt 18 connected to a plug 19 which is press fitted into the open end of column 16. Surrounding plug 19 and the upper end of column 16 is a hollow nut 20 having a central threaded opening 21 which engages the threads on bolt 18. Thus, the threaded socket in the bottom of camera 11 receives bolt 18 and after suitable interconnection, nut 20 is rotated to be tightened against the bottom of camera 11. The lower end of column 16 may be provided with a rubber tip 22.

Tripod 10 further includes a central platform member, generally designated 30, for receiving and supporting balls 14 at the upper ends of legs 12 and for receiving and supporting, for movement in an axial direction, elongate column 16. Central platform member 30 comprises an elongate collet 31 which surrounds column 16, the lower half of collet 31 being externally threaded, at 32. The upper half of collet 31 has a plurality of axial slots 33 therein, defining plural collet segments 34. Furthermore, at the extreme upper end of collet 31, the outer surface thereof is tapered, as shown at 35, to provide an increased thickness, for reasons which will appear more fully hereinafter.

Figure 3:
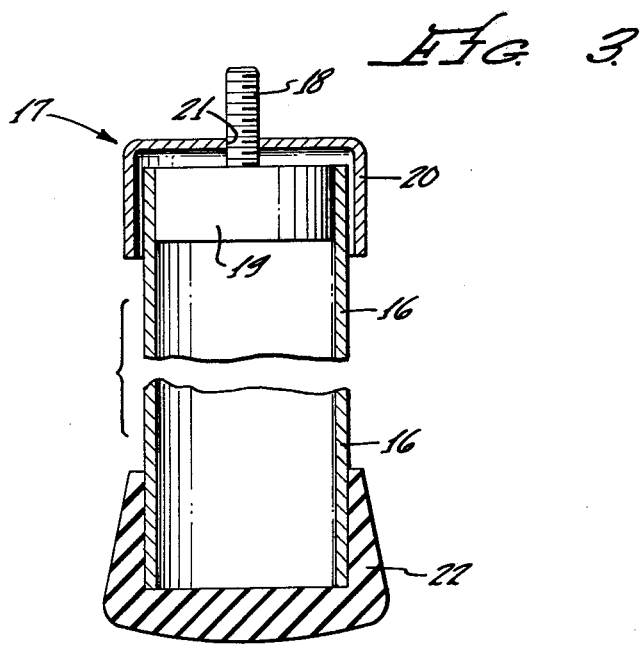
FIG. 3 is a sectional view showing the opposite ends of the elongate column of the camera tripod of FIGS. 1-2.

Central platform member 30 further comprises a generally cylindrical trunnion 36 which surrounds a central portion of collet 31, partially overlapping the upper and lower halves thereof. Trunnion 36 has a plurality of radially directed bores 37 which extend entirely therethrough, bores 37 being spaced uniformly at 120° intervals around the circumference of trunnion 36. As shown most clearly in FIGS. 2–4, bores 37 define recesses in the outer surface of trunnion 36 for receipt of portions of spherical balls 14. In this regard, the diameters of bores 37 are smaller than the diameters of balls 14 so that balls 14 can extend only partially into bores 37.

Central platform member 30 further comprises a disc-shaped cap 40 having a central opening so as to surround collet 31, above trunnion 36. Cap 40 extends radially outwardly to a point approximately aligned with the centers of balls 14 when balls 14 are positioned within recesses 37 in trunnion 36 and then angularly downwardly, at 41, to contact balls 14 on the sides thereof opposite from recesses 37 in trunnion 36. Thus, as shown most clearly in FIG. 4, angular portion 41 of cap 40 holds balls 14 in recesses 37 in trunnion 36 whereby the combination of trunnion 36, the recesses 37 therein, and cap 40 functions as a socket for balls 14. In this regard, it should be noted that such socket is adjustable by moving trunnion 36 axially relative to cap 40. In other words, as trunnion 36 moves downwardly relative to cap 40, the distance between trunnion 36 and angular portion 41 of cap 40 increases and ball 14 is partially released. On the other hand, as trunnion 36 moves upwardly towards cap 40, the distance between trunnion 36 and angular portion 41 of cap 40 decreases, increasing the force exerted on balls 14.

Figure 4:
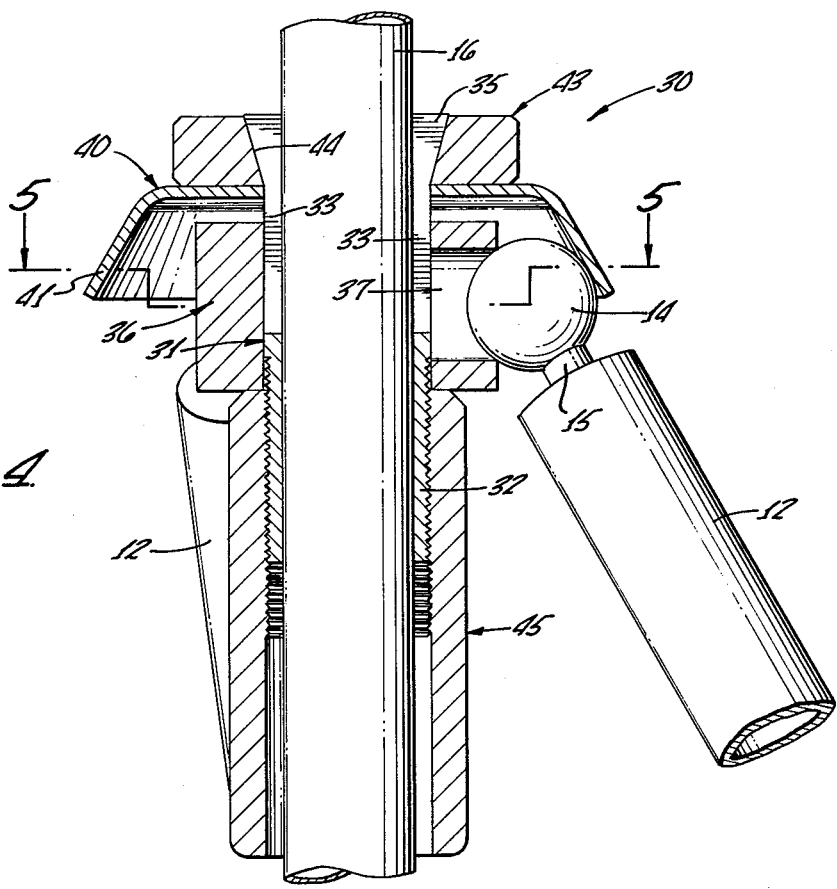
FIG. 4 is a longitudinal sectional view taken through the central platform member of the camera tripod of FIG. 1.
Figure 5:
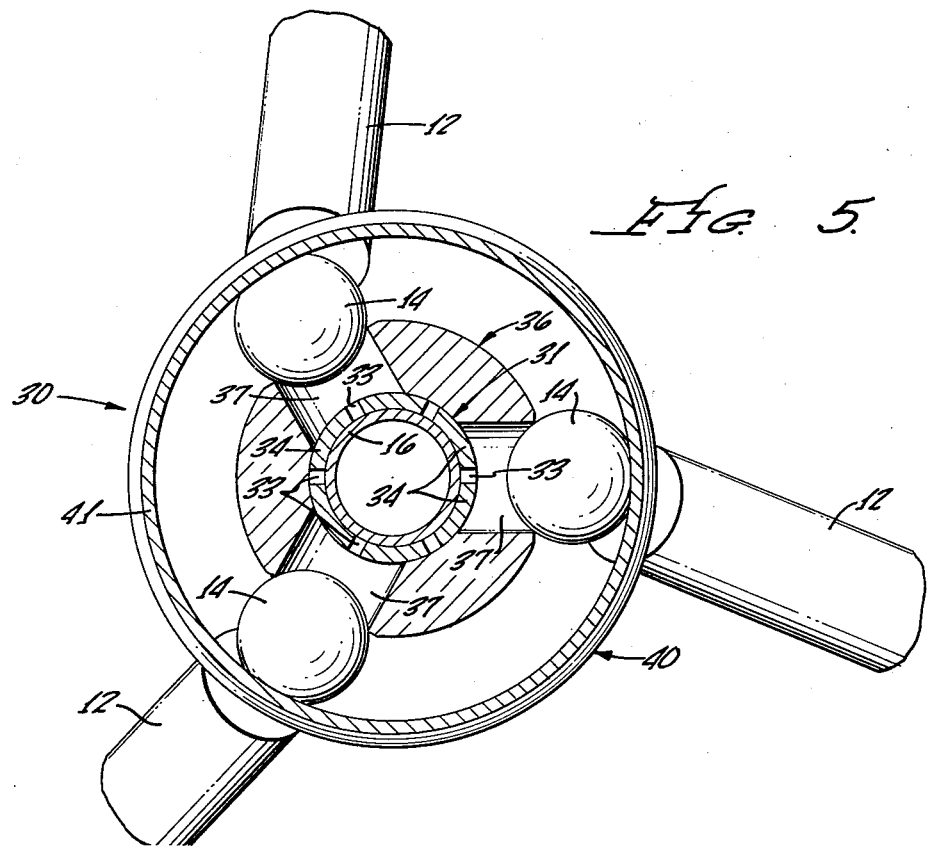
FIG. 5 is a sectional view taken along the line 5—5 in FIG. 4.

Central platform member 30 further comprises a cylindrical collar 43 which surrounds collet 31, between the upper end thereof and cap 40. Collar 43 has a tapered inside surface 44 which is positioned at an identical angle as the tapered surface at the upper end 35 of collet 31. When in operative position, as shown in FIG. 4, the tapered inside surface 44 of collar 43 engages the tapered upper end 35 of collet 31.

Finally, central platform member 30 further comprises an elongate nut 45 which surrounds collet 32, below trunnion 36, and engages the external threads at the lower end thereof. The length of nut 45 is such that it may be readily gripped in one hand of a user and rotated relative to collet 31. Since collet 31 cannot be directly gripped, collar 43 preferably has a knurled outer surface to permit it to be gripped by the other hand of the user during rotation of nut 45.

OPERATION

In operation, trunnion 36, in combination with cap 40, operates to define a plurality of sockets for receipt of balls 14 at the upper ends of legs 12. Furthermore, collet 31 operates to support column 16 for axial movement relative thereto. Finally, collet 31, collar 43, and nut 45 function as a unitary locking means for simultaneously, and in one operation, locking legs 12 and column 16 to central platform member 30.

More specifically, with nut 45 sufficiently loosened so as to permit movement of collet 31 relative to collar 43 and to permit movement of trunnion 36 relative to cap 40, column 16 is freely movable within collet 31 and balls 14 are freely rotatable between bores 37 in trunnion 36 and angular portion 41 of cap 40. At this time, legs 12 are permitted substantially unlimited freedom of movement within a given sector, each of legs 12 being pivotable back and forth until stem 15 contacts the edges of bores 37 and being pivotable upwardly and downwardly until legs contact nut 45 or the end of cap 40 abuts against stem 15. Thus, legs 12 can be positioned in any desired direction and at any desired angle relative to a vertical reference line to permit convenient use on any irregular surface. Furthermore, after legs 12 are positioned, if column 16 is not exactly vertical, it may be readily tilted or rotated without any readjustment of the positions of legs 12.

When it is desired to fix column 16 and prevent movement of platform member 30 relative to legs 12, collar 43 is gripped with one hand, nut 45 is gripped with the other hand, and nut 45 is rotated relative to collar 43. Tightening of nut 45 in this manner draws nut 45 towards tapered end 35 of collet 31, simultaneously locking column 16 and legs 12. More specifically, tightening of nut 45 urges trunnion 36 towards cap 40, thereby tightening balls 14 at the upper ends of legs 12 between trunnion 36 and angular portion 41 of cap 40. This tightening of the socket resists rotation of balls 14 therein. However, it should be noted that while nut 45 may be tightened sufficiently to prevent undesirable movement of legs 12, it still may be maintained sufficiently loose to permit minor adjustments of legs 12 without loosening nut 45.

Tightening of nut 45 relative to collet 31 also forces the tapered, increased-thickness, upper end 35 of collet 31 down into collar 43 whereby segments 34 of collet 31 are squeezed radially inwardly because of tapered surface 44 in collar 43. Thus, segments 34 of collet 31 are tightened around column 16 to firmly grip column 16 and to permit axial movement thereof relative to collet 31.

As discussed previously, camera 11 may be readily connected to one end of column 16 by means of fitting 17. Furthermore, with nut 45 sufficiently loosened to permit movement of column 16, tip 22 may be removed from one end thereof and column 16 completely removed from central platform member 30. Thereafter, column 16 may be reinserted with fitting 17 below central platform member 30, which is often required to take close-ups resting on the surface beneath tripod 10. This eliminates the necessity for a fitting 17 at both ends of column 16.

It can therefore be seen that in accordance with the present invention, there is provided a camera tripod which solves the problems of the prior art in a manner unknown heretofore. With tripod 10, legs 12 are connected to central platform member 30 in a manner that permits substantially unlimited freedom of movement within a given sector. This eliminates the necessity for adjustable legs and second platforms adjustably mounted to platform member 30. However, it will be apparent to those skilled in the art that legs 12 may be made adjustable in length to permit folding thereof if such is deemed desirable. Furthermore, a conventional device may be connected to bolt 18 of fitting 17 to permit positioning of camera 11 in a vertical direction.

Tripod 10 is substantially simpler than existing tripods in that platform member 30 includes a unitary locking device for simultaneously, and in one operation, locking to platform member 30, not only all of legs 12, but column 16 which is normally freely axially movable relative to member 30. Furthermore, once the unitary locking means is activated to firmly interconnect legs 12, central platform member 30, and column 16, there is still a sufficient degree of flexibility that platform 30 may be rotated about a vertical axis or tilted about any horizontal axis to permit minor adjustments in the position of camera 11, without the necessity of releasing the locking device.

With the above features, tripod 10 results in a considerable simplification and can be manufactured and sold at a price which is substantially less than existing tripods. Furthermore, as a result of the simplification, tripod 10 is much more convenient to use and permits use in a wider variety of situations than available heretofore.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A tripod comprising:
   a plurality of elongate legs, each of said legs terminating in a ball at the upper end thereof;
   an elongate column including a camera-connecting fitting at one end thereof; and
   central platform means receiving and supporting said upper ends of said legs and receiving and supporting for movement in an axial direction said elongate column, said platform means including:

a collet surrounding said elongate column and having an externally threaded lower end and a slotted upper end, said collet further having a tapered, increased-thickness upper end;

a generally cylindrical trunnion surrounding a central portion of said collet and having a plurality of recesses in the outer surface thereof for receipt of portions of said balls;

a disc-shaped cap surrounding said collet, above said trunnion, and extending radially outwardly and then angularly downwardly to contact said balls on the sides thereof opposite from said recesses in said trunnion;

a cylindrical collar surrounding said collet, between said upper end thereof and said cap, said collar having a tapered inside surface which is identical to and engages the tapered upper end of said collet; and a nut surrounding said collet, below said trunnion, and engaging the external threads thereon whereby tightening of said nut relative to said collet simultaneously urges said trunnion towards said cap, tightening said balls at said upper ends of said legs between said trunnion and said cap to lock said legs to said trunnion and forces said upper end of said collet into said collar thereby tightening said slotted upper end of said collet around said column to lock said column to said collet.

2. A tripod according to claim 1 wherein tightening of said nut still permits movement of said balls within said sockets to permit readjustment of said legs after said tripod is locked.

3. A tripod according to claim 1 wherein said nut is elongated to permit the outer surface thereof to be readily gripped and rotated relative to said collet.

4. A tripod according to claim 3 wherein said collar has a knurled outer surface to permit it to be gripped during rotation of said elongated nut.

5. A tripod according to claim 1 wherein said trunnion includes a plurality of radially directed bores which extend entirely therethrough, spaced uniformly at 120° intervals around the circumference thereof, said bores defining said recesses.

6. A tripod according to claim 5 wherein the diameters of said bores in said trunnion are smaller than the diameters of said balls.

* * * * *